United States Patent [19]
Hoebeke et al.

[11] Patent Number: 5,898,670
[45] Date of Patent: Apr. 27, 1999

[54] BURSTY TRAFFIC MULTIPLEXING ARRANGEMENT AND METHOD FOR SHAPING AND MULTIPLEXING BURSTY INPUT FLOWS

[75] Inventors: Rudy Georges Hoebeke, Antwerp; Wim Pol Meurisse, Harelbeke; Gert Van der Plas, Merchtem; Guido Henri Marguerite Petit, Antwerp, all of Belgium

[73] Assignee: Alcatel N.V., Rijswijk, Netherlands

[21] Appl. No.: 08/724,889

[22] Filed: Oct. 3, 1996

[30] Foreign Application Priority Data

Oct. 6, 1995 [EP] European Pat. Off. .............. 95202684

[51] Int. Cl.$^6$ ................................. H04J 3/16; H04J 3/22
[52] U.S. Cl. ........................................... 370/468; 370/538
[58] Field of Search ..................... 370/229, 232, 370/230, 235, 531, 535, 536, 538, 540, 542, 231, 233, 234, 236, 414, 416, 418, 468, 522

[56] References Cited

U.S. PATENT DOCUMENTS

| | | | |
|---|---|---|---|
| 5,050,161 | 9/1991 | Golestani | 370/230 |
| 5,535,196 | 7/1996 | Alhara et al. | 370/230 |
| 5,594,868 | 1/1997 | Nakagoshi et al. | 370/230 |
| 5,604,731 | 2/1997 | Grossglauser et al. | 370/232 |
| 5,646,943 | 7/1997 | Elwalid | 370/538 |
| 5,650,993 | 7/1997 | Lakshman et al. | 370/236 |
| 5,663,962 | 9/1997 | Caire et al. | 370/229 |
| 5,701,292 | 12/1997 | Chiussi et al. | 370/232 |
| 5,784,358 | 7/1998 | Smith et al. | 370/230 |

FOREIGN PATENT DOCUMENTS

| | | |
|---|---|---|
| 0487235 | 5/1992 | European Pat. Off. . |
| 9501029 | 1/1995 | WIPO . |

OTHER PUBLICATIONS

A Capacity Allocation Rule for ATM Networks by Vakil, published Nov. 29, 1993, pp. 409–414, IEEE in Houston, Globecom '93, IEEE Global Telecommunications Conference. vol. 1.

IEEE Network, Jul./Aug. 1995, vol. 9, No. 4, "A Taxonomy for Congestion Control Algorithms in Packet Switching Networks" by Yang and Reddy. pp. 34–45.

Telecommunications, Apr. 1995, vol. 29, No. 4, "ABR: Realizing the Promise of ATM" by Richard, pp.27–39.

*Primary Examiner*—Ajit Patel
*Assistant Examiner*—Chiho Andrew Lee
*Attorney, Agent, or Firm*—Milton Oliver; Ware, Fressola, Van Der Sluys & Adolphson LLP

[57] ABSTRACT

A bursty traffic multiplexing arrangement (A) includes a multiplexing unit (MUX) to multiplex a plurality of bursty input flows (IF1, ... , IFI, ... , IFN) into an output flow (OF). Congestion due to insufficient throughput capacity of the multiplexing unit (MUX) is avoided by incorporating an input shaping device (ISDI) for each input (MII) of the multiplexing unit (MUX). Data elements constituting such an input flow (IFI) are stored in an input buffer (IBI) which forms part of the corresponding input shaping device (ISDI), and are applied to the multiplexing unit (MUX) at a rate (BI) which does not exceed a predetermined maximum input buffer reading rate (BIMAX) associated to this input buffer (IBI). Furthermore, via feedback input flow rate control information (IFRI), the input flow rates (A1, ... , AI, ... , AN) can be controlled to thereby avoid input buffer overload.

9 Claims, 1 Drawing Sheet

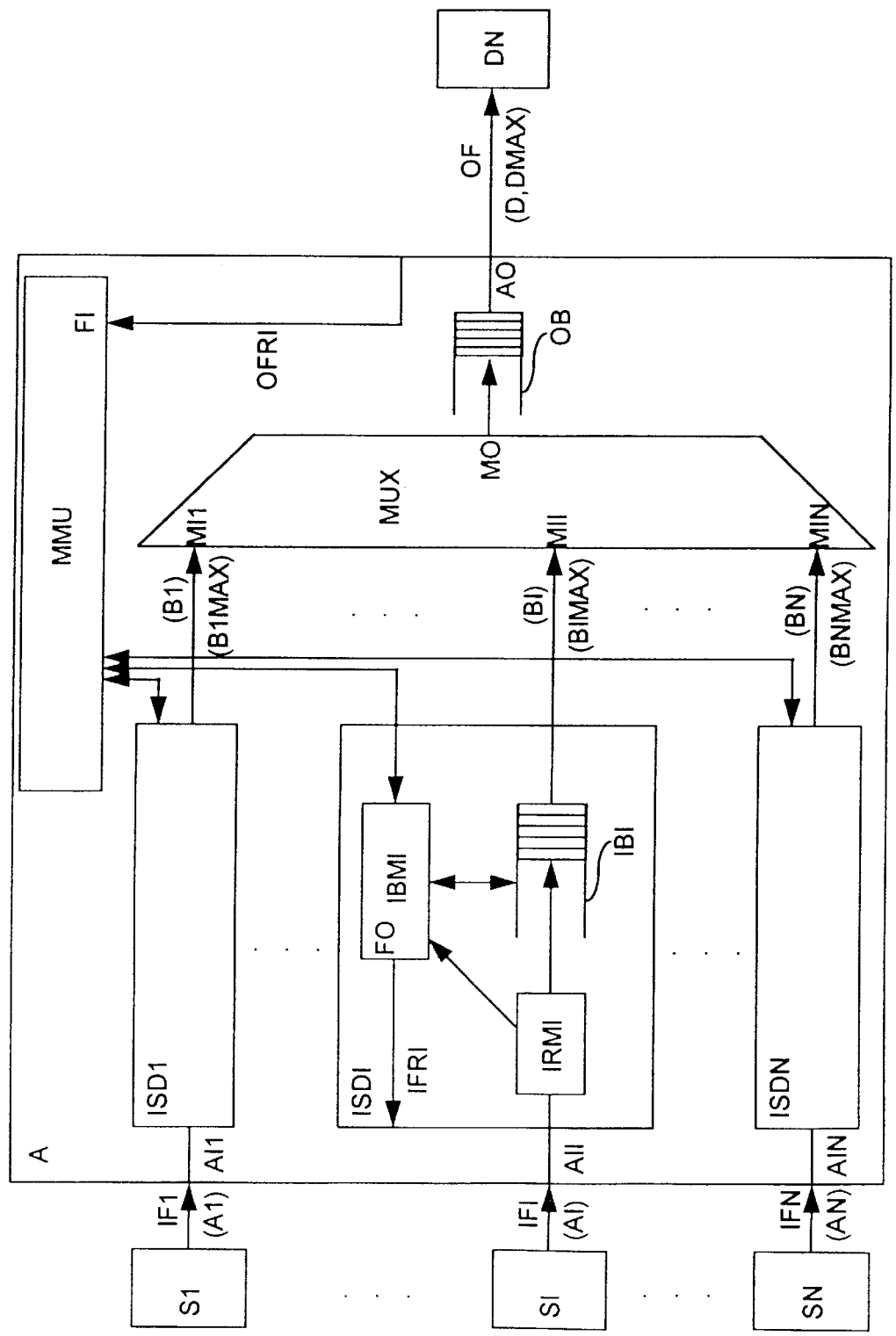

BURSTY TRAFFIC MULTIPLEXING ARRANGEMENT AND METHOD FOR SHAPING AND MULTIPLEXING BURSTY INPUT FLOWS

TECHNICAL FIELD

The present invention relates to a bursty traffic multiplexing arrangement including a multiplexing unit adapted to multiplex a plurality of bursty input flows, transmitted at respective input flow rates from respective source nodes to respective arrangement inputs of said bursty traffic multiplexing arrangement, and adapted to thereby generate an output flow for transmission towards a destination node at an output flow rate which does not exceed a maximum output flow rate. It is also directed to a method for shaping and multiplexing a plurality of bursty input flows performed by such an arrangement.

BACKGROUND OF THE INVENTION

Such a bursty traffic multiplexing arrangement and such a method performed thereby are already known in the art, e.g. from the international application published under the Patent Cooperation Treaty (PCT) WO 95101029 entitled 'Flow Control Method'. Therein, an arrangement called switch statistically multiplexes ATM (Asynchronous Transfer Mode) inputs into output flows which are provided at output ports thereof. The switch, as is seen in the figure on page 1 of the above cited document, includes an output queue to temporarily store the output flows. To avoid buffer congestion situations, i.e. situations wherein the output queue has insufficient storage capacity to store all data elements applied thereto, a receiving port in the network that the switch forms part of is enabled to transmit congestion indication messages to a source port in the network whenever congestion is approached. Upon receipt of such congestion indication messages, the source port reduces the permitted bandwidth or the transmit rate for transmission. As long as the source port does not receive such a congestion indication message, its transmit rate is increased in small increments.

If, in the arrangement, the multiplexing unit has insufficient throughput capacity to multiplex all input flows applied simultaneously to its inputs, these input flows are transformed before they reach the above output queue and output port. Consequently, information is lost. Obviously, this drawback of the known switch can be avoided by using a multiplexing unit with sufficient throughput capacity. In other words, no information is lost if the multiplexer throughput capacity is equal to or greater than the maximum aggregate input flow data rate. The use of such a multiplexer to multiplex input flows with bursty nature however implies that part of its capacity is left unused most of the time, and therefore this is no adequate solution.

SUMMARY OF THE INVENTION

An object of the present invention is to provide a bursty traffic multiplexing arrangement and a method for shaping and multiplexing bursty input flows performed thereby wherein the probability for congestion situations wherein the aggregate input flow exceeds the multiplexer throughput capacity or the available output flow rate, is minimized in an adequate way.

According to the invention this object is achieved for each input of the multiplexing unit, the bursty traffic multiplexing arrangement includes an input shaping device coupled between one of the arrangement inputs and the multiplexer input, the input shaping device comprising an input buffer, provided to temporarily store data elements which form part of one of the input flows applied to said one of the arrangement inputs and to be read at an input buffer reading rate; and an input buffer monitoring unit which is adapted to control the input buffer reading rate so that it does not exceed a predetermined maximum input buffer reading rate.

The object is also achieved by a method for shaping and multiplexing a plurality of bursty input flows, transmitted by respective source nodes at respective input flow rates to provide an output flow for transmission to a destination node at an output flow rate which does not exceed a predetermined maximum output flow rate, the method including the step of multiplexing the input flows into the output flow, characterized in that the method additionally includes for each input flow of the plurality of input flows the steps of: temporarily storing data elements which form part of the input flow in an input buffer thereto provided; determining a maximum input buffer reading rate for the input buffer; and reading the data elements from the input buffer and applying the data elements to a multiplexing unit adapted to perform the multiplexing at an input buffer reading rate which does not exceed the predetermined maximum input buffer reading rate, the above steps being performed before the multiplexing.

In this way, data elements constituting an input flow are temporarily stored in an input buffer and are read from this input buffer at a limited rate. The maximum allowable input buffer reading rate is determined for each input buffer in such a way that the throughput capacity of the multiplexer and the available rate on the output link to the destination node are fairly shared amongst all input flows. Thereby, it is guaranteed that capacity needed to multiplex the aggregate input flow, i.e. the sum of all input buffer reading rates, does not exceed the multiplexer throughput capacity since this would imply loss of data. Thus, in a switching node according to the present invention, input flows are queued in buffers in such a way that these flows are not damaged due to insufficient multiplexer throughput capacity or insufficient output flow availability.

An additional characteristic feature of the present multiplexing arrangement is that input buffer congestion situations are avoided.

Indeed by tuning the input flow rates via feedback input flow rate control information transmitted to the different sources, precautions are taken to avoid input buffer overflow, which would also imply loss of information. Thus, the input buffers are monitored by units which are enabled to make the sources reduce their transmit rates.

Also an additional feature of the present multiplexing arrangement is that the approach of congestion situations can be detected.

In this way, by measuring the input flow rate and comparing the measurement to the corresponding maximum input buffer reading rate, input buffer congestion is predicted and precautions are taken to avoid loss of information.

Another feature of the present invention is that each input buffer monitoring unit calculates a requested input buffer reading rate and provides the master monitoring unit with this requested input buffer reading rate.

Thus, the master monitoring unit is aware of all requested input buffer reading rates and can calculate the total requested input rate for the multiplexing unit by summing all requested input buffer reading rates. If the total requested input rate exceeds the output or multiplexer capacity, the master monitoring unit assigns maximum input buffer reading rates lower than the requested input buffer reading rates to the respective input buffers. Otherwise, the maximum input buffer reading rate assigned to each input buffer equals the requested input buffer reading rate thereof.

Yet another feature of the present invention is that the bursty traffic multiplexing arrangement further includes a master monitoring unit.

As a result, changes in the available bandwidth or capacity on the output link are known by the arrangement and the maximum input buffer reading rate of all input buffers is adapted so that the complete capacity is shared between all input flows at any moment. If the output flow capacity on the link to the destination node is reduced, the maximum input buffer reading rates at which the input buffers are served, are reduced equivalently. The master monitoring unit therefore distributes the available output capacity in accordance with predetermined fairness algorithm amongst all input flows. The description of such a fairness algorithm is not relevant with respect to the present invention. For an overview of the most commonly used fairness algorithms, reference is made to the article 'A taxonomy for Congestion Control Algorithms in Packet Switching Networks', written by the authors Cui-Qing Yang and Alapati V. S. Reddy, and published in 'IEEE Network, the Magazine of Global Information Exchange', Vol. 9, No. 4, July/August 1995.

Furthermore, a feature of the present invention is that the master monitoring unit is aware of the maximum throughput capacity of the multiplexing unit.

Thus, when additional output capacity becomes available, the master monitoring unit redistributes this capacity amongst the input flows only if the throughput capacity of the multiplexer is not exceeded by the new available output flow rate.

Still a further feature of the present multiplexing arrangement is that, at the output thereof, an output buffer can be is provided.

In this way, phase mismatches between the different input shaping devices are compensated by temporarily storing data elements which constitute the output flow.

BRIEF DESCRIPTION OF THE DRAWING

The above mentioned and other objects and features of the invention will become more apparent and the invention itself will be best understood by referring to the following description of an embodiment taken in conjunction with the accompanying drawing, which represents a functional block scheme of an embodiment of the bursty traffic multiplexing arrangement according to the present invention.

BEST MODE FOR CARRYING OUT THE INVENTION

The multiplexing arrangement A of the figure is dedicated to support the ABR (Available Bit Rate) service in an ATM (Asynchronous Transfer Mode) network. This ABR service is a class of ATM transmission of LAN (Local Area Network) or other bursty, delay insensitive data. Since low cell loss and a minimum cell rate are guaranteed, ABR is a service which provides reliable transport of bursty data. To obtain a cell loss ratio equal to the cell loss ratio of the physical layer over which data are transferred, a closed loop feedback mechanism is used in ABR to allow reporting congestion to source nodes. Upon receipt of congestion indications, the source nodes reduce their transmit rates to thereby avoid cell loss. The ABR service guarantees a fair share of the available bandwidth and is robust to misbehaving users who accidentally send more data than allowed by their contract. Cell loss is minimized but no absolute guarantee is given regarding delay. Management of the ABR service thus requires buffering, control and feedback indication.

To enable network elements (intermediate switching nodes or destination nodes) to communicate with the source node in order to control the source transmission rate, an ABR source node regularly sends RM (Resource Management) cells which are modified and reflected by the destination node or by the intermediate nodes along the communication path. Such an RM cell contains a CI (Congestion Indication) bit, an NI (No Increase) bit, and an ER (Explicit Rate) value. When the CI bit is set in a received RM cell, the source node decreases its transmission rate exponentially; when the NI bit is set, the source node stops increasing its transmission rate; and when neither the CI or NI bit are set, the source node increases its transmission rate stepwise until it reaches the ER (Explicit Rate) value. Indeed, a sophisticated feedback mechanism called 'explicit rate marking' allows all intermediate nodes to adapt the ER field in RM cells by writing therein the maximum available bandwidth value.

Further information with respect to the ABR service is not given here since such information is not relevant with respect to the present invention. Nevertheless, for an overview of the ABR issues and a framework to control traffic and feedback information flow, reference is made to the articles 'ABR: Realizing the Promise of ATM', written by N Rickard and published in the magazine 'Telecommunications', Vol. 29, Number 4 of April 1995, and 'The Rate-Based Flow Control Framework for the Available Bit Rate ATM Service', written by Flavio Bonomi and Kerry W. Fendick and published in the magazine 'IEEE Network', March/April 1995.

The multiplexing arrangement A of the figure includes a multiplexing unit MUX, N input shaping devices, ISD1, . . . , ISDI, . . . , ISDN, a master monitoring unit MMU, and an output buffer OB. Each input shaping device has a similar structure and is thus built up from the functional blocks which are drawn in the figure only for ISDI: therein, IBI represents an input buffer, IBMI represents an input buffer monitoring unit, and IRMI is an input rate measuring unit. The multiplexing arrangement A further is provided with N inputs, AI1, . . . , AII, . . . , AIN, whereto N sources, S1, . . . , SI, . . . , SN, are coupled respectively, and an output AO which is coupled to a destination node DN.

Inside the multiplexing arrangement A, each input AI1. . . , AII, . . . , AIN is coupled to a corresponding input M1u, . . . , MII, . . . MIN of the multiplexing unit MUX via a respective one of the input shaping devices, ISD1, . . . , ISDI, . . . ISDN. More particularly, for ISDI the arrangement input AII is coupled to the multiplexer input MII via the cascade connection of the input rate measuring unit IRMI and the input buffer IBI, the structure of the other input shaping devices being similar as already mentioned earlier. The multiplexer output MO, on the other hand, is coupled to the arrangement output AO via the output buffer OB. A feedback connection OFRI is coupled between an output of the destination node DN and a feedback input FI of the master monitoring unit MMU. In the figure however, only a part of this connection inside the multiplexing arrangement A is drawn. N terminals of the master monitoring unit MMU are further connected via bi-directional links to terminals of the respective input buffer monitoring units IBM1, . . . , IBMI, . . . , IBMN of which only IBMI is shown. A feedback output FO of the input buffer monitoring unit IBMI is further coupled to an input of the corresponding source node SI via a connection IFRI that is also partially drawn. Finally, the input buffer IBI and input buffer monitoring unit IBMI belonging to the same input shaping device ISDI, are interconnected via a bi-directional link, whilst a second output of the input rate measuring unit IRMI is coupled to still another input of the input buffer monitoring unit IBMI included in the same input shaping device ISDI.

In the following paragraphs, the different blocks, MUX, IRMI, IBI, IBMI, MMU and OB, constituting the multiplexing arrangement A will be described by means of the functions executed thereby. Specific details with respect to implementation of these blocks will not be given since it will be clear for a person skilled in the art from the functional description how to implement the different blocks.

The working of the multiplexing arrangement A is as follows:

ABR input flows IF1, . . . , IFI, . . . , IFN which may each supply up to 150 Mbit/sec are transmitted by the sources S1, . . . , SI, . . . , SN respectively. Input flow IFI is applied to a first input A/1 of the multiplexing arrangement A, input flow IFI is applied to input AII of the arrangement, and so on. The input flow rates A1, . . . , AI, . . . , AN at which the input flows IF1, . . . , IFI, . . . , IFN are transmitted respectively are also marked on the figure.

The multiplexing unit MUX combines these input flows IF1, . . . , IFI . . . , IFN into an output flow OF which is transmitted at an output flow rate D to the destination node DN. The bandwidth available on the link between the arrangement A and the destination node DN is represented by DMAX and is supposed to be equal to 200 Mbit/sec. As a consequence the output flow rate D is not allowed to exceed 200 Mbit/sec since this would imply loss of information. It is a task of the arrangement A to respect this output flow rate limitation.

The multiplexing unit MUX itself has a throughput capacity of 150 Mbit/sec and therefore a transformed aggregate input flow will be fed to the arrangement output AO if no precautions are taken to limit this aggregate input flow, i.e. the combined input flow which enters the multiplexing unit MUX. To control the aggregate input flow of the multiplexing unit MUX, each ABR input flow IF1, . . . , IFI, . . . , IFN is buffered in a corresponding input buffer IB1, . . . , IBI, . . . , IBN respectively. Under the control of respective input buffer monitoring units IBM1, . . . ,IBMI, . . . IBMN, these input buffers IB1, . . . IBI, . . . , IBN are read at input buffer reading rates B1 . . . , BI . . . , BN respectively. Evidently, the input buffer reading rates B1, . . . , BI, . . . , BN are determined so that the aggregate input flow, i.e. B1+ . . . +BI+ . . . +BN, does not exceed the multiplexer throughput capacity, nor the available output flow bandwidth DMAX. Therefore, each input buffer monitoring unit IBMI, as will be shown later, is aware of the input flow rate AI and the level of filling of the corresponding input buffer IBI. From this input flow rate AI and the level of filling the input buffer monitoring unit IBMI calculates a requested input buffer reading rate and supplies its requested input buffer reading rate to the master monitoring unit MMU. Thereupon, the master monitoring unit MMU, which is aware of the throughput capacity of the multiplexing unit MUX and of the available output flow bandwidth DMAX, assigns to each input buffer IB1, . . . , IBI, . . . , IBN a maximum input buffer reading rate B1MAX, . . . , BIMAX, . . . , BNMAX that may not be exceeded by the input buffer reading rates B1, . . . , BI, . . . , BN respectively. These maximum input buffer reading rates B1MAX, . . . , BIMAX, . . . , BNMAX equal the requested input buffer reading rates if the total requested input rate, i.e. the sum of all input buffer reading rates, does not exceed the output or multiplexer capacity. Otherwise, the master monitoring unit MMU generates maximum input buffer reading rates B1 MAX, . . . , BIMAX, . . . , BNMAX lower than the requested input buffer reading rates but in proportion thereto. Thus, the available capacity, i.e. the minimum of the multiplexer throughput capacity and the available output flow bandwidth DMAX, is shared between all input flows IF1, . . . , IFI, . . . , IFN. The master monitoring unit MMU thereto uses a fairness algorithm but the description thereof, as already said in the introductory part, goes beyond the scope of this application. The input buffer monitoring units IBM1, . . . , IBMI, . . . , IBMN are informed about the maximum allowable serve rates B1 MAX, . . . , BIMAX, . . . , BNMAX respectively via the different links that interconnect the master monitoring unit MMU with the input buffer monitoring units IBM1, . . . , IBMI, . . . , IBMN.

RM (Resource Management) cells indicating he available capacity on the output link to the destination node DN are received by the master monitoring unit MMU via the feedback input FI thereof. Whenever the available output flow capacity DMAX changes, the master monitoring unit MMU is aware thereof and immediately redistributes the new available capacity, i.e. the minimum of the multiplexer throughput capacity and the new available output bandwidth DMAX, amongst the input flows IF1, . . . , IFI, . . . , IFN by calculating a new set of maximum input buffer reading rates B1MAX, . . . , BIMAX, BNMAX.

The multiplexer throughput capacity and the available output flow bandwidth DMAX are thus never exceeded by the aggregate input flow. Nevertheless, an output buffer OB is coupled between the multiplexer output MO and the arrangement output AO because the input buffers IB1, . . . , IBI, . . . , IBN may not be properly phased.

In the following the working of the shaping device ISDI is explained in details, the working of the other shaping devices being similar. The input rate measuring unit IRMI of ISDI measures the input flow rate AI and applies this measurement to the input buffer monitoring unit IBMI to enable it to detect approach of input buffer congestion situations, i.e. situations wherein the input buffer IBI is completely filled and wherein information is bound to be lost due to insufficient storage capacity of the input buffer IBI, and to enable it to determine the above described requested input buffer reading rate. Based on the input flow measurements, on knowledge of the maximum input buffer reading rate B1MAX supplied by MMU as explained earlier, and by monitoring the level of filling of the input buffer IBI, the input buffer monitoring unit IBMI detects approach of congestion and generates input flow rate information IFRI. This input flow rate information IFRI is sent to the source SI to make this source reduce its transmission rate AI. The form of the input flow rate information IFRI is not relevant with respect to the present invention. In the ABR service class, the input buffer monitoring unit IBMI for example receives the RM cells transmitted by the source SI, modifies the CI (Congestion Indication) and NI (No Increase) bits or the ER (Explicit Rate) value thereof and retransmits the modified RM cells backward to the source SI.

It has to be noticed that, although the above described embodiment of a multiplexing arrangement A is dedicated to support the ABR (Available Bit Rate) service in ATM (Asynchronous Transfer Mode) networks, the present invention is not restricted to this field of application. Indeed, it is clear to a person skilled in the art how to adapt the above described arrangement A to be applicable e.g. to the VBR+ (Variable Bit Rate Plus) class, which is another class of service that is under consideration by the ATM Forum. Like ABR, the VBR+ service has a closed-loop feedback control system but additional guarantees with respect to delay are provided too.

Furthermore, it also has to be noticed that the use of a multiplexing arrangement A according to the present invention is not restricted to a specific type of switching nodes. In an ATM network that supports the ABR service, the arrangement A can form part of VS/ND (Virtual Source/Virtual Destination) nodes with ER (Explicit Rate) based working or with EFCI (Explicit Forward Congestion Indication) based working since the difference between these protocols only relies upon the information fields in the RM (Resource Management) cells that are modified by these nodes and by the route which is followed by these RM cells to return back to the source node. Multiplexing arrangements used in such switching nodes are thus different in the way their input buffer monitoring units IBMI provide feedback input flow rate information IFRI.

Also a remark is that all input buffers IB1, ..., IBI, ..., IBN as well as the output buffer OB, in a preferred embodiment of the invention, are equipped with shapers which control the reading of these buffers and compensate for mismatches between the arrival of data at the input of the respective buffers.

Still a remark is that the above figures for ABR input flow rates, multiplexer throughput capacity and available output bandwidth are, of course, given as an example and not as a restriction on the scope of the present invention.

While the principles of the invention have been described above in connection with specific apparatus, it is to be clearly understood that this description is made only by way of example and not as a limitation on the scope of the invention.

What is claimed is:

1. A bursty traffic multiplexing arrangement (A) including a multiplexing unit (MUX) adapted to multiplex a plurality of bursty input flows (IF1, ..., IFI, ..., IFN), transmitted at respective input flow rates (A1, ..., AI, ..., AN) from respective source nodes (S1, ..., SI, ..., SN) to respective arrangement inputs (AI1, ..., AII, ..., AIN) of said bursty traffic multiplexing arrangement (A), and adapted to thereby generate an output flow (OF) for transmission towards a destination node (DN) at an output flow rate (D) which does not exceed a maximum output flow rate (DMAX), said multiplexing arrangement (A) comprising
for each input (MII) of said multiplexing unit (MUX), an input shaping device (ISDI), coupled between one (AII) of said arrangement inputs (AI1, ..., AII, ..., AIN) and said multiplexer input (MII), said input shaping device (ISDI) comprising;
a) an input buffer (IBI), provided to temporarily store data elements which form part of one (IFI) of said input flows (IF1, ..., IFI, ..., IFN) applied to said one (AII) of said arrangement inputs (AI1, ..., AII, ..., AIN) and to be read at an input buffer reading rate (BI);
b) an input buffer monitoring unit (IBMI) which is adapted to control said input buffer reading rate (BI) so that it does not exceed a predetermined maximum input buffer reading rate (BIMAX); and
a master monitoring unit (MMU), coupled to each of said input buffer monitoring units, and having a feedback input (FI) to which is applied output flow rate control information (OFRI), transmitted by said destination node (DN) to indicate said maximum output flow rate (DMAX), said master monitoring unit determining said predetermined maximum input buffer reading rate (BIMAX) of each said input shaping device (ISDI) based on said output flow rate control information; and wherein said input buffer monitoring unit (IBMI) generates input flow rate control information (IFRI) to be transmitted towards a source node (SI) of said plurality of source nodes (S1, ..., SI, ... SN) that is coupled to said one (AII) of said arrangement inputs (AI1, ..., AII, ..., AIN) to thereby enable said source node (SI) to modify said input flow rate (AI), said input buffer monitoring unit (IBMI) thereto being provided with a feedback output (FO) which is coupled to an input of said source node (SI).

2. A bursty traffic multiplexing arrangement (A) according to claim 1, characterized in that said input shaping device (ISDI) further includes an input rate measuring unit (IRMI), provided to measure said input flow rate (AI) and to apply a measured rate value to said input buffer monitoring unit (IBMI) to enable it to determine said input flow rate control information (IFRI).

3. A bursty traffic multiplexing arrangement (A) according to claim 2, characterized in that, said input buffer monitoring unit (IBMI) is adapted to detect whether said input flow rate (AI) exceeds said maximum input buffer reading rate (BIMAX) at a moment said input buffer (IBI) is already filled to a predetermined level and to accordingly determine said input flow rate control information (IFRI) to enable said source node (SI) upon receipt of said input flow rate control information (IFRI) to decrease said input flow rate (AI).

4. A bursty traffic multiplexing arrangement (A) according to claim 2, characterized in that said input buffer monitoring unit (IBMI) is adapted to calculate a requested input buffer reading rate from said measured rate value and from a level of filling of said input buffer (IBI), and to apply said requested input buffer reading rate to said master monitoring unit (MMU) to enable it to determine said maximum input buffer reading rates (B1MAX, ..., BIMAX, ..., BNMAX).

5. A bursty traffic multiplexing arrangement (A) according to claim 4, characterized in that said master monitoring unit (MMU) is adapted to determine said predetermined maximum input buffer reading rate (BIMAX) in such a way that a maximum aggregate input flow, which is the sum of the maximum input buffer reading rates (B1MAX, ..., BIMAX, ..., BNMAX) of all input buffers, does not exceed the lower one of said maximum output flow rate (DMAX) and the throughput capacity of said multiplexing unit (MUX).

6. A bursty traffic multiplexing arrangement (A) according to claim 1, characterized in that said arrangement (A) further includes an output buffer (OB), coupled between an output (MO) of said multiplexing unit (MUX) and an arrangement output (AO), and provided to temporarily store data elements of said output flow (OF).

7. A method for shaping and multiplexing a plurality of bursty input flows (IFI, ..., IFI, ..., IFN), transmitted by respective source nodes (S1, ..., SI, ..., SN) at respective input flow rates (A1, ..., AI, ..., AN) to provide an output flow (OF) for transmission to a destination node (DN) at an output flow rate (D) which does not exceed a predetermined maximum output flow rate (DMAX) indicated by feedback information from said destination node (DN), said method including the step of multiplexing said input flows (IF1, ..., IFI, ..., IFN) into said output flow (OF), characterized in that said method additionally includes, for each input flow (IFI) of said plurality of input flows (IF1, ..., IFI, ..., IFN) the steps of:

a) temporarily storing data elements which form part of said input flow (IFI) in an input buffer (IBI) thereto provided;

b) determining a maximum input buffer reading rate (BIMAX) for said input buffer (IBI);

c) modifying, in said source node, said input flow rate (AI) based upon input flow rate information (IFRI) generated by and fed back from a respective input buffer monitoring unit (IBMI); and d) reading said data elements from said input buffer (IBI) and applying the data elements to a multiplexing unit (MUX) adapted to perform said multiplexing at an input buffer reading rate (BI) which does not exceed said predetermined maximum input buffer reading rate (BIMAX), said steps being performed before said multiplexing.

8. A bursty traffic multiplexing arrangement (A) including a multiplexing unit (MUX) adapted to multiplex a plurality of bursty input flows (IF1, ..., IFI, ..., IFN), transmitted at respective input flow rates (A1, ..., AI, ..., AN) from respective source nodes (S1, ..., SI, ..., SN) to respective arrangement inputs (AI1, ..., AII, ..., AIN) of said bursty traffic multiplexing arrangement (A), and adapted to thereby generate an output flow (OF) for transmission towards a destination node (DN) at an output flow rate (D) which does not exceed a maximum output flow rate (DMAX), said multiplexing arrangement (A) comprising for each input (MII) of said multiplexing unit (MUX), an input shaping device (ISDI), coupled between one (AII) of said arrangement inputs (AI1, ..., AII, ..., AIN) and said multiplexer input (MII), said input shaping device (ISDI) comprising;

a) an input buffer (IBI), provided to temporarily store data elements which form part of one (IFI) of said input flows (IF1, ..., IFI, ..., IFN) applied to said one (AII) of said arrangement inputs (AI1, ..., AII, ..., AIN) and to be read at an input buffer reading rate (BI); and b) an input buffer monitoring unit (IBMI) which is adapted to control said input buffer reading rate (BI) so that it does not exceed a predetermined maximum input buffer reading rate (BIMAX); wherein said input buffer monitoring unit (IBMI) generates input flow rate control information (IFRI) to be transmitted towards a source node (SI) of said plurality of source nodes (S1, ..., SI, ... SN) that is coupled to said one (AII) of said arrangement inputs (AI1, ..., AII, ..., AIN) to thereby enable said source node (SI) to modify said input flow rate (AI), said input buffer monitoring unit (IBMI) thereto being provided with a feedback output (FO) which is coupled to an input of said source node (SI).

9. A bursty traffic multiplexing arrangement according to claim 8, further comprising a master monitoring unit (MMU), coupled to each of said input buffer monitoring units, and having a feedback input (FI) to which is applied output flow rate control information (OFRI), transmitted by said destination node (DN) to indicate said maximum output flow rate (DMAX), said master monitoring unit determining said predetermined maximum input buffer reading rate (BIMAX) of each said input shaping device (ISDI) based on said output flow rate control information (OFRI).

* * * * *